United States Patent
Yokote et al.

(10) Patent No.: US 7,862,184 B2
(45) Date of Patent: Jan. 4, 2011

(54) PROJECTION DISTANCE ADJUSTABLE PROJECTION DISPLAY APPARATUS

(75) Inventors: Yoshihiro Yokote, Yokohama (JP); Takashi Miwa, Higashi-Osaka (JP); Ryuhei Amano, Hirakata (JP); Michihiro Okuda, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 417 days.

(21) Appl. No.: 12/025,235

(22) Filed: Feb. 4, 2008

(65) Prior Publication Data

US 2008/0198338 A1    Aug. 21, 2008

(30) Foreign Application Priority Data

Feb. 16, 2007   (JP)   ............... 2007-036707

(51) Int. Cl.
*G03B 21/14* (2006.01)
(52) U.S. Cl. .............. 353/101; 353/87; 353/98
(58) Field of Classification Search ........... 353/87, 353/98, 101
See application file for complete search history.

(56) References Cited

U.S. PATENT DOCUMENTS

| | | | |
|---|---|---|---|
| 2006/0139582 A1* | 6/2006 | Saito | 353/101 |
| 2006/0203211 A1* | 9/2006 | Kim | 353/101 |
| 2007/0108028 A1* | 5/2007 | Lu | 353/98 |
| 2007/0247599 A1* | 10/2007 | Kadowaki et al. | 353/101 |

FOREIGN PATENT DOCUMENTS

JP     08-292496     11/1996

\* cited by examiner

*Primary Examiner*—Seung C Sohn
(74) *Attorney, Agent, or Firm*—Mark A. Motsenbocker; Mots Law, PLLC

(57) ABSTRACT

A projection display apparatus is provided with a projection distance adjustment mechanism for adjusting a distance between a projection plane and an emitting position of projection light, and provided with a focus adjustment mechanism for making a focus adjustment of a projection image with respect to the projection plane. The focus adjustment mechanism is driven such that a projection image is properly focused onto the projection plane in accordance with the distance between the projection plane and the emitting position.

8 Claims, 11 Drawing Sheets

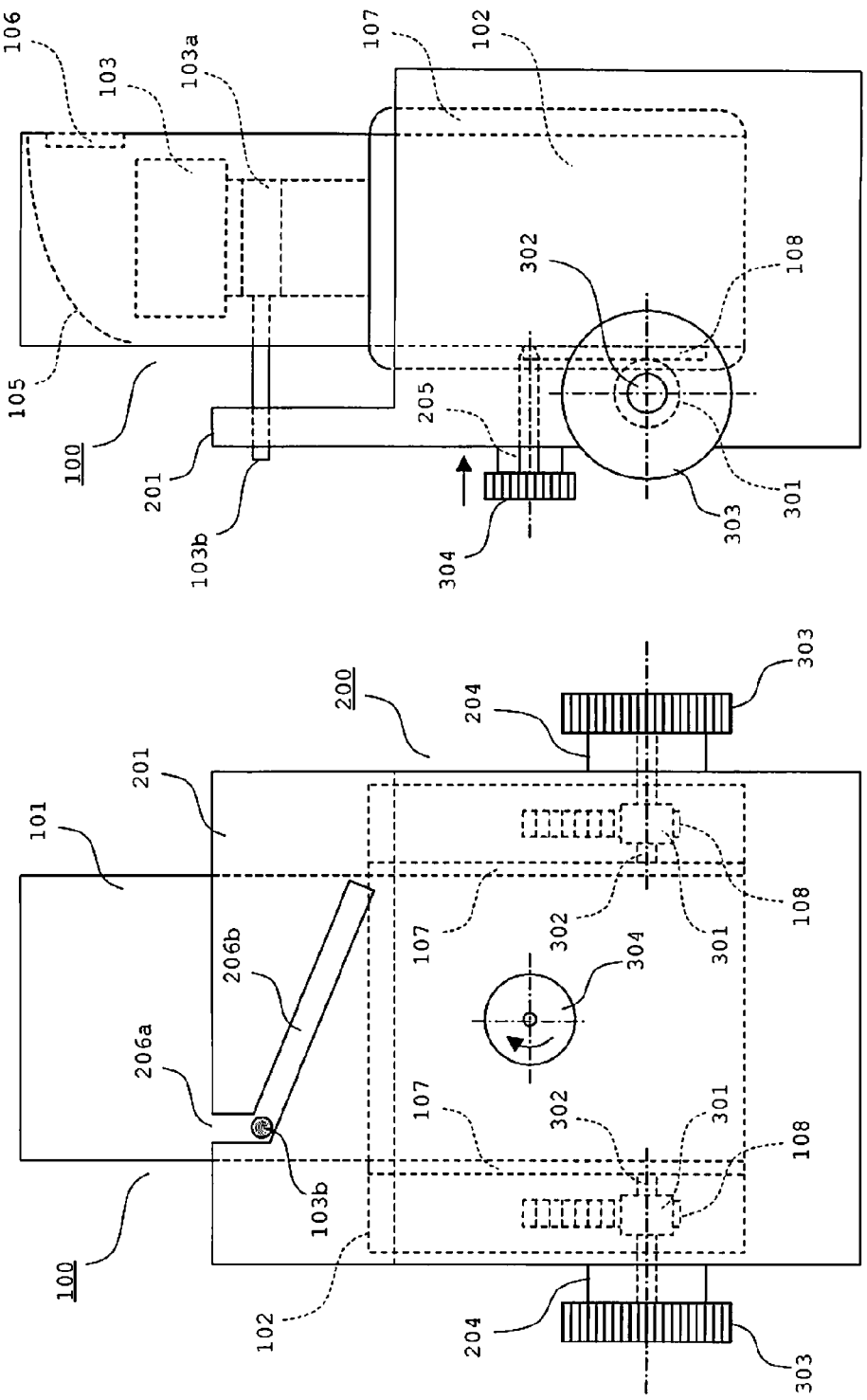

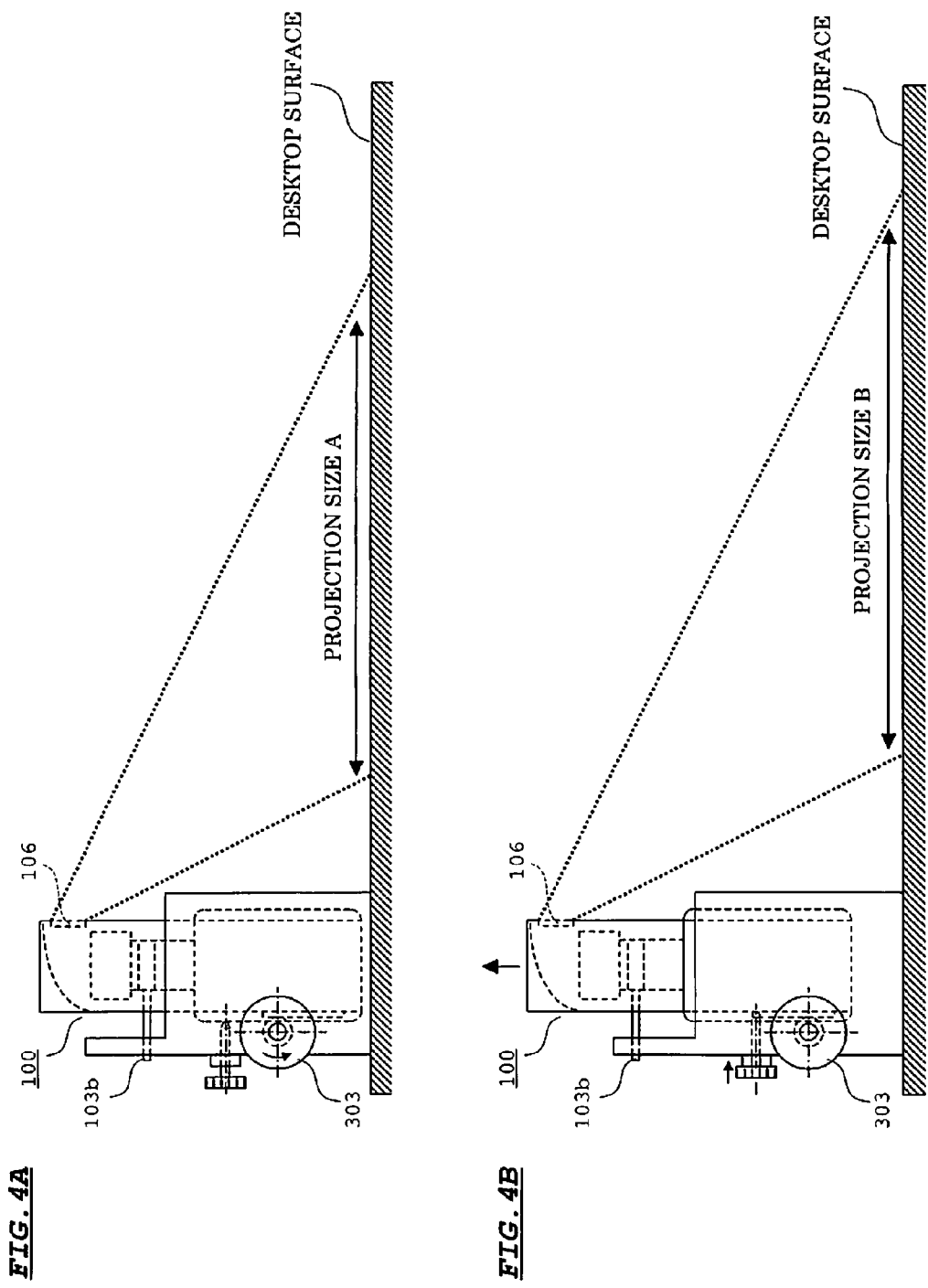

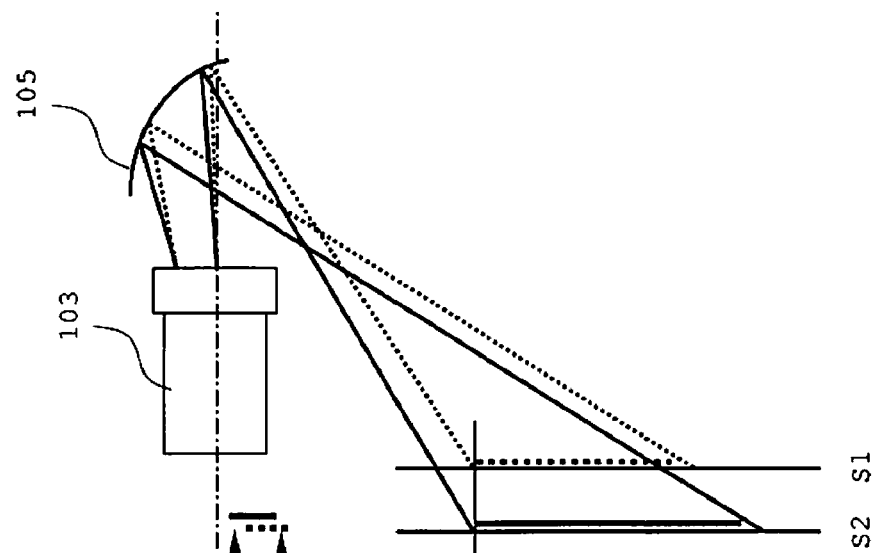
FIG. 11A
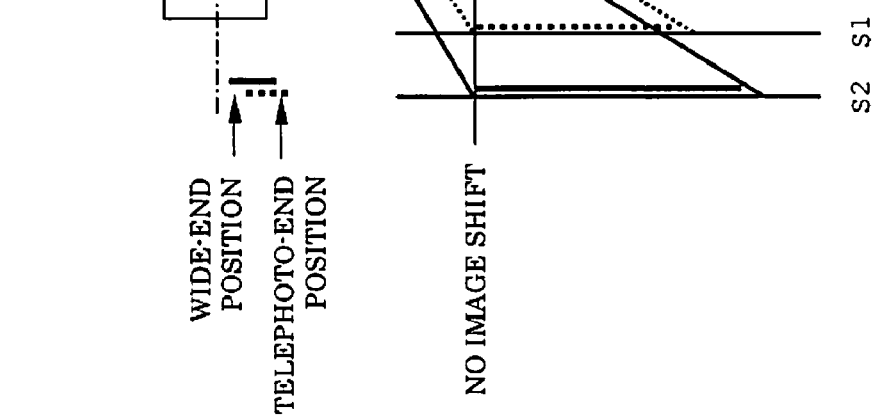
FIG. 11B
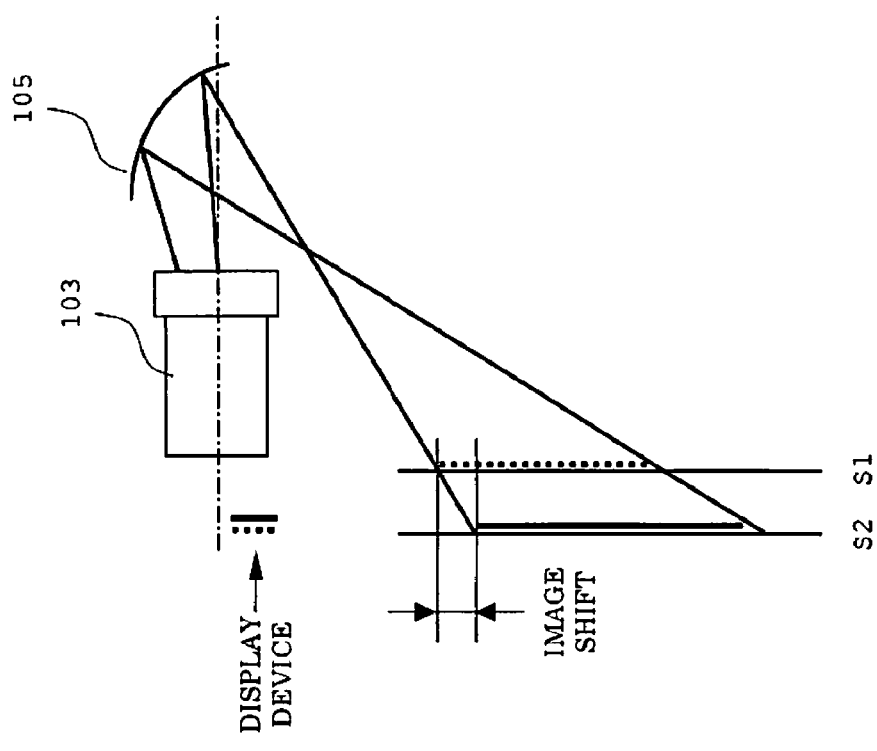

PROJECTION DISTANCE ADJUSTABLE PROJECTION DISPLAY APPARATUS

This application claims priority under 35 U.S.C. Section 119 of Japanese Patent Application No. 2007-036707 filed Feb. 16, 2007, entitled "PROJECTION DISPLAY APPARATUS".

BACKGROUND OF THE INVENTION

1. Field of the Invention

The present invention relates to a projection display apparatus for displaying an image on a projection plane, and more particularly, is suited for use in a projection display apparatus that is mounted on the projection plane.

2. Description of the Related Art

Conventionally, in projection display apparatuses (projectors), types of the projectors that project an image onto a screen, wall surface or the like have been common. Recently, in keeping up with a trend towards compact configurations, there have been proposed projectors that are mounted on a desk and project an image onto a desktop surface (hereinafter, referred to as "desk mountable projector"). In such a desk mountable projector, however, since a distance between a position from which projection light is emitted and a projection plane (desktop surface) is significantly short, it is difficult to shift a group of zoom adjustment lenses of the projector to perform focus adjustment in terms of an optical design. On the other hand, a zoom function has been a major advantage of the conventional projectors, and thus needs to be also incorporated into the desk mountable projectors.

Besides zoom adjustment, focus adjustment is an essential function of the projectors. Generally, focus adjustment is made in accordance with a change in a zoom state. More specifically, focus adjustment is carried out as appropriate to eliminate a blur in a projection image caused by the change in the zoom state. Therefore, important issues in the desk mountable projectors are to use a proper zoom adjustment method and to achieve a focus adjustment function in cooperation with the zoom adjustment method.

SUMMARY OF THE INVENTION

A projection display apparatus according to a main aspect of the present invention comprises: a projection distance adjustment mechanism for adjusting a distance between a projection plane onto which a projection image is projected and an emitting position of projection light; a focus adjustment mechanism for making focus adjustment of the projection image with respect to the projection plane; and a focus drive adjustment part for driving the focus adjustment mechanism such that the projection image is properly focused onto the projection plane in accordance with the distance between the projection plane and the emitting position.

With a configuration according to this aspect, the projection distance adjustment mechanism adjusts the distance between the projection plane and the emitting position of the projection light. This distance adjustment changes a size of a projection image and makes a zoom adjustment of the projection image. Further, the focus adjustment mechanism is driven in cooperation with the distance adjustment, and thus, a focus adjustment is made to the projection image on the projection plane. As stated above, with the configuration according to this aspect, zoom adjustment and focus adjustment are carried out in cooperation with each other. Note that the configuration according to this aspect can be smoothly applied to the desk mountable projection display apparatuses since zoom adjustment is made by adjusting the distance between the projection plane and an emitting position of the projection light.

BRIEF DESCRIPTION OF THE DRAWINGS

The foregoing and other objects and novel features of the present invention will be more fully understood by reading a description of preferred embodiments below with reference to the accompanying drawings as follows:

FIGS. 3A and 3B are respectively a rear view and a side view showing a state when the projector main body is in an uppermost position thereof according to the embodiment of the present invention;

FIGS. 4A and 4B are each an illustrative view of a zooming operation in the projector according to the embodiment of the present invention;

FIG. 11 is an illustrative view of an image shift suppression action of the projector according to the embodiment of the present invention shown in FIG. 10.

The drawings are merely intended for illustration and do not set any limits to the scope of the present invention.

DESCRIPTION OF THE PREFERRED EMBODIMENTS

Below, preferred embodiments of the present invention will be described with reference to the drawings. In those embodiments, the present invention is used for a desk mountable projector.

Figure 1B:
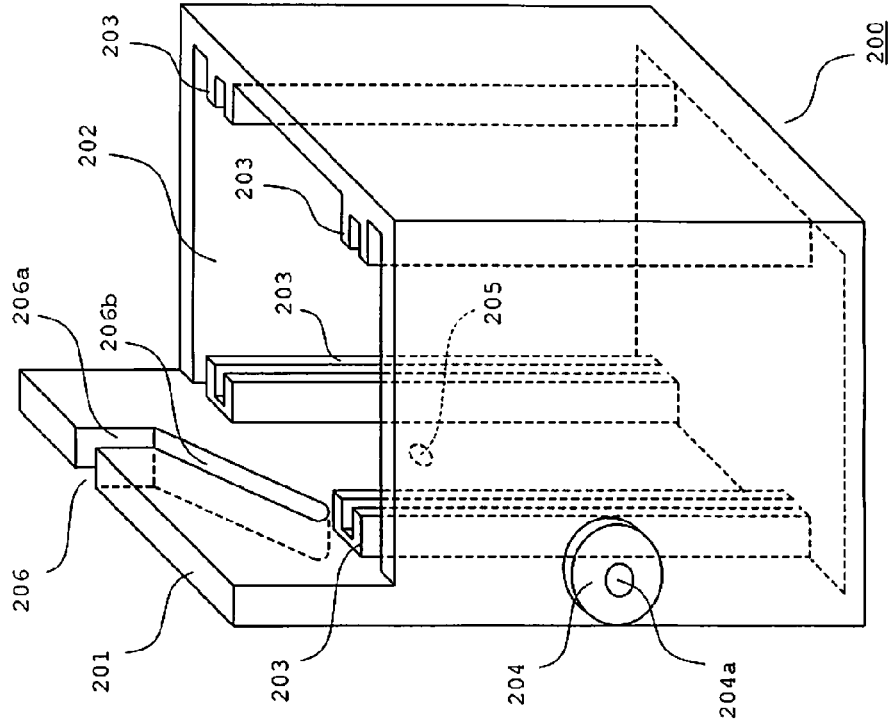
FIGS. 1A and 1B are respectively perspective views showing a projector main body and a holder according to an embodiment of the present invention.
Figure 1A:
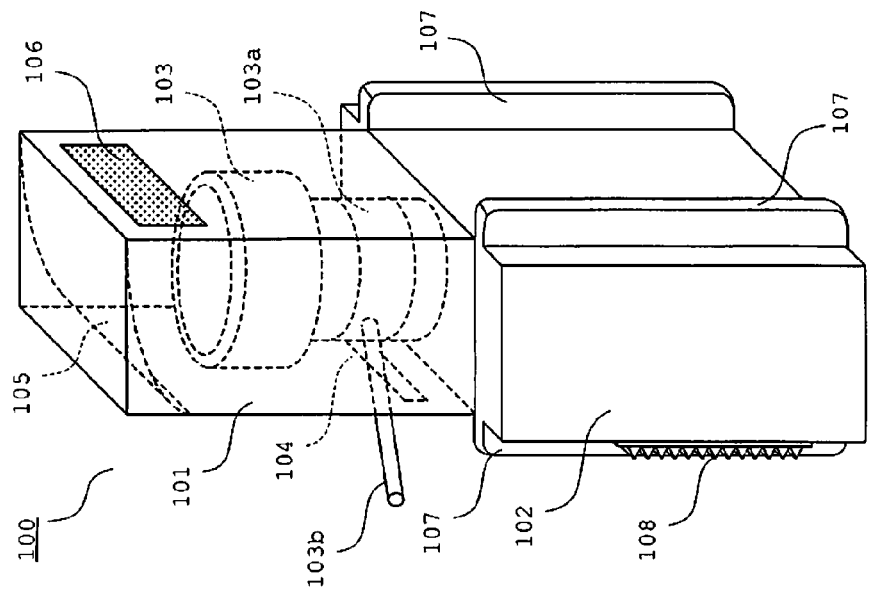

FIG. 1A is a perspective view of a projector main body 100, and FIG. 1B is a perspective view of a holder 200 that holds the projector main body 100 such that the projector main body 100 can be vertically displaced. Note that the projector main body 100 corresponds to a driven part defined in the claims, and that the holder 200 corresponds to a fixing part defined in the claims.

First, referring to FIG. 1A, a structure of the projector main body 100 will be discussed. The projector main body 100 comprises an upper housing 101 and a lower housing 102. The upper housing 101 houses a projection lens 103 and a mirror 105, and the lower housing 102 houses an optical system other than the projection lens 103, and a circuit part for driving and controlling a light source, a display device and the like.

The projection lens 103 is provided with a focus adjustment ring 103a. Rotating and driving this ring in a circumferential direction causes a change in a focus state of a projection image on a projection plane. The upper housing 101 has a horizontal notch 104 formed in a rear surface thereof. Through the notch 104, a pin 103b planted on an outer peripheral surface of the focus adjustment ring 103a protrudes toward the outside. The upper housing 101 further has a projection window 106 disposed in a front surface thereof for guiding projection light reflected by the mirror 105 to the projection plane.

The mirror 105 has a concave curved surface in a light incident surface. A shape of the curved surface is adjusted such that the projection image can properly be projected onto the projection plane. Accordingly, with the thus designed mirror 105 disposed on a rear stage of the projection lens 103, it is possible to properly project a projection image onto a projection plane even when a distance between an emitting position of projection light (position of the projection window 106) and the projection plane (desktop surface) is short as in a desk mountable projector according this embodiment of the present invention.

Two protrusions 107 vertically extend on each of front and rear surfaces of the lower housing 102. In addition, two rack gears 108 vertically extend on the rear surface of the lower housing 102, one rack gear being formed at a right side of the right protrusion on the rear surface and the other rack gear being formed at a left side of the left protrusion on the rear surface.

Next, referring to FIG. 1B, a structure of the holder 200 will be described. The holder 200 is a rectangular bottomed enclosure that has a wall 201 on a rear side. Guides 203 are formed in front and rear inner surfaces of an opening 202 to individually engage with the protrusions 107 in the projector main body 100. In addition, bosses 204 are formed on right and left side surfaces of the holder 200, and holes 204a pass through the bosses 204 to the opening 202. Further, a boss (not shown) is formed in the rear surface of the holder 200, and a screw hole 205 passes through the boss to the opening 202. Moreover, a guide groove 206 is formed in the wall 201 to engage with the pin 103b in the projector main body 100. The guide groove 206 comprises an entrance part 206a and a cam part 206b.

To house the projector main body 100 in the holder 200, the projector main body 100 is inserted in the opening 202 from above the holder 200 while the four protrusions 107 in the projector main body 100 is brought into engagement with the respective guides 203. In doing so, the pin 103b in the projector main body 100 is inserted into the entrance part 206a in the guide groove 206, and then moved into a deep end part of the cam part 206b while the pin 103b is being rotated along the cam part 206b.

Figures 2A, 2B:
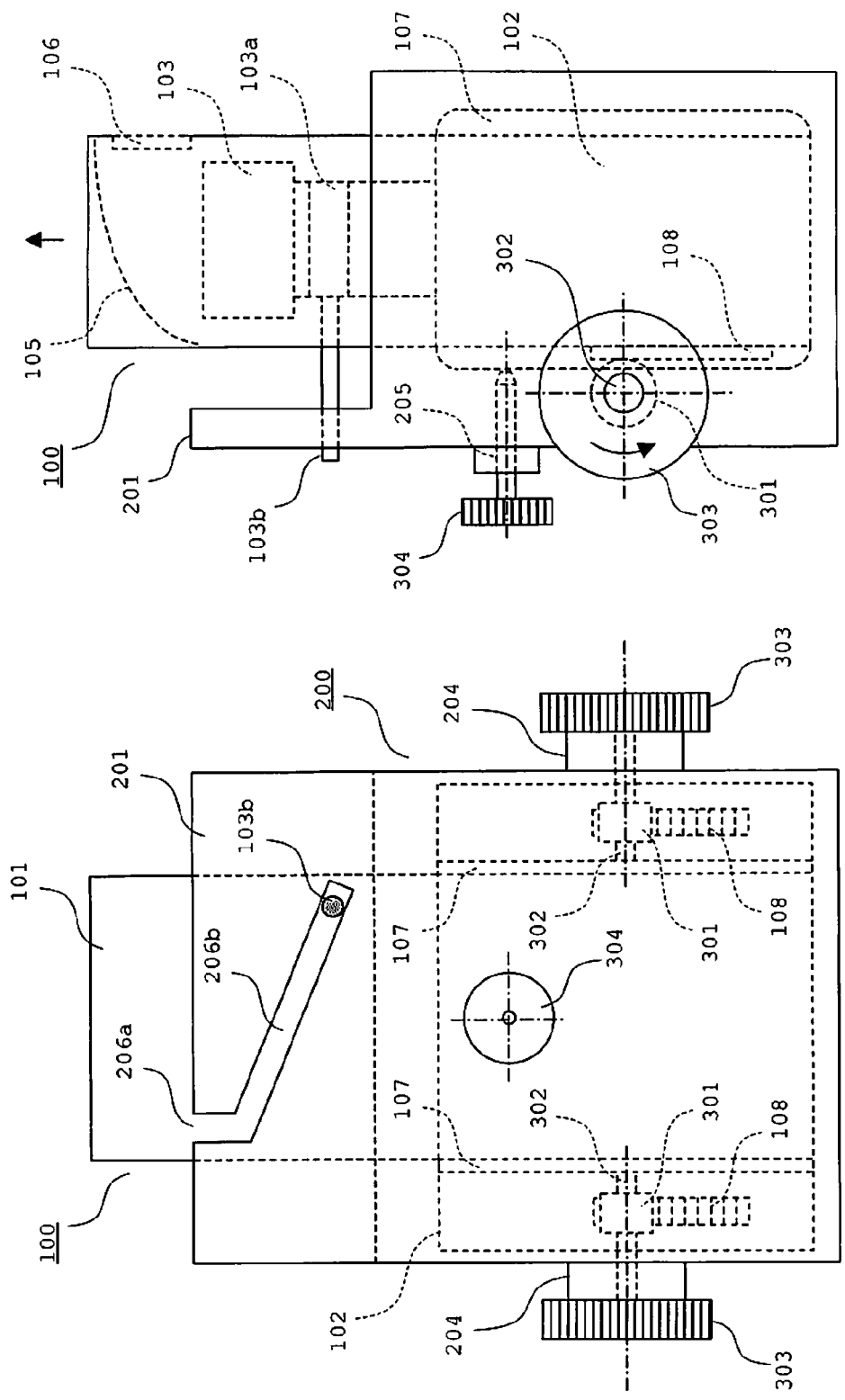
FIGS. 2A and 2B are respectively a rear view and a side view showing a state when the projector main body is housed in the holder according to the embodiment of the present invention.

At the time of housing, the projector main body 100 is attached to the holder 200 by meshing two pinion gears 301 respectively with the two rack gears 108 in the projector main body 100, as shown in FIGS. 2A and 2B. The two pinion gears 301 are respectively axially supported by two shafts 302. The two shafts 302 are respectively inserted into holes 204a formed in the right and left side surfaces of the holder 200. Knobs 303 are attached to ends of the shafts 302 protruding outward from the bosses 204. This allows the two pinion gears 301 to rotate by turning the knobs 303. Accordingly, when the knobs 303 are rotated, driving force of rotation is transmitted via the pinion gears 301 to the rack gears 108, causing the projector main body 100 to vertically move along the guides 203.

A stopper 304 with a threaded part is screwed into a screw hole 205 in the rear surface of the holder 200. By turning the stopper 304, a tip of the stopper 304 is pressed against the rear surface of the projector main body 100, thereby restricting vertical movement of the projector main body 100.

FIGS. 2A and 2B illustrate a state when the projector main body 100 is housed in the holder 200. Note that FIG. 2A is a rear view of the projector and FIG. 2B is a left side view of the projector.

When the stopper 304 is loosened in such a state as shown in FIGS. 2A and 2B and the knobs 303 are turned in a direction indicated by an arrow in FIG. 2B, the projector main body 100 moves upward along the guides 203. With this movement, the pin 103b moves along the cam part 206b, thereby rotating the focus adjustment ring 103a in a circumferential direction.

Herein, the cam part 206b is shaped such that a driving amount of the projector main body 100 is converted into a driving amount suited to the focus adjustment ring 103a. More specifically, a driving amount of the projector main body 100 is converted by the cam part 206b into a rotating amount of the focus adjustment ring 103a, such that, when the projector main body 100 is driven by the driving amount, the projection image is properly focused onto the desktop surface (projection plane). Preferably, means (a ring or the like) for facilitating smooth sliding of the pin 103b within the cam part 206b is added to a portion of the pin 103b in engagement with the cam part 206b.

FIGS. 3A and 3B illustrate a state when the projector main body 100 is moved into an uppermost position thereof. Note that FIG. 3A is a rear view of the projector and FIG. 3B is a left side view of the projector. When the stopper 304 is operated in this state, the projector main body 100 is locked at a position indicated in FIGS. 3A and 3B. In this situation, the pin 103b is located at an uppermost position in the cam part 206b. This allows the projector to be in a focus state such that the projection image is properly focused onto the desktop surface when the projector main body 100 is in the uppermost position thereof.

Alternatively, the projector main body 100 may be locked before the projector main body 100 is displaced to the position shown in FIGS. 3A and 3B. In this case, the stopper 304 may be operated when the projector main body 100 is in a desired position. In this state, the pin 103b is also located in a position where the projection image is properly focused onto the desktop surface by action of the cam part 206b.

FIGS. 4A and 4B illustrate changes in a projection size when the projector main body 100 is vertically moved. FIG. 4A shows a state when the projector main body 100 is in a lowermost position thereof, and FIG. 4B shows a state when the projector main body 100 is in the uppermost position thereof.

As shown in FIGS. 4A and 4B, as the projector main body 100 moves from the lowermost position to the uppermost position thereof, the distance between the emitting position of projection light (position of the projection window 106) and the desktop surface become longer. This increases the projection size on the desktop surface from projection size A to projection size B.

Figure 5:
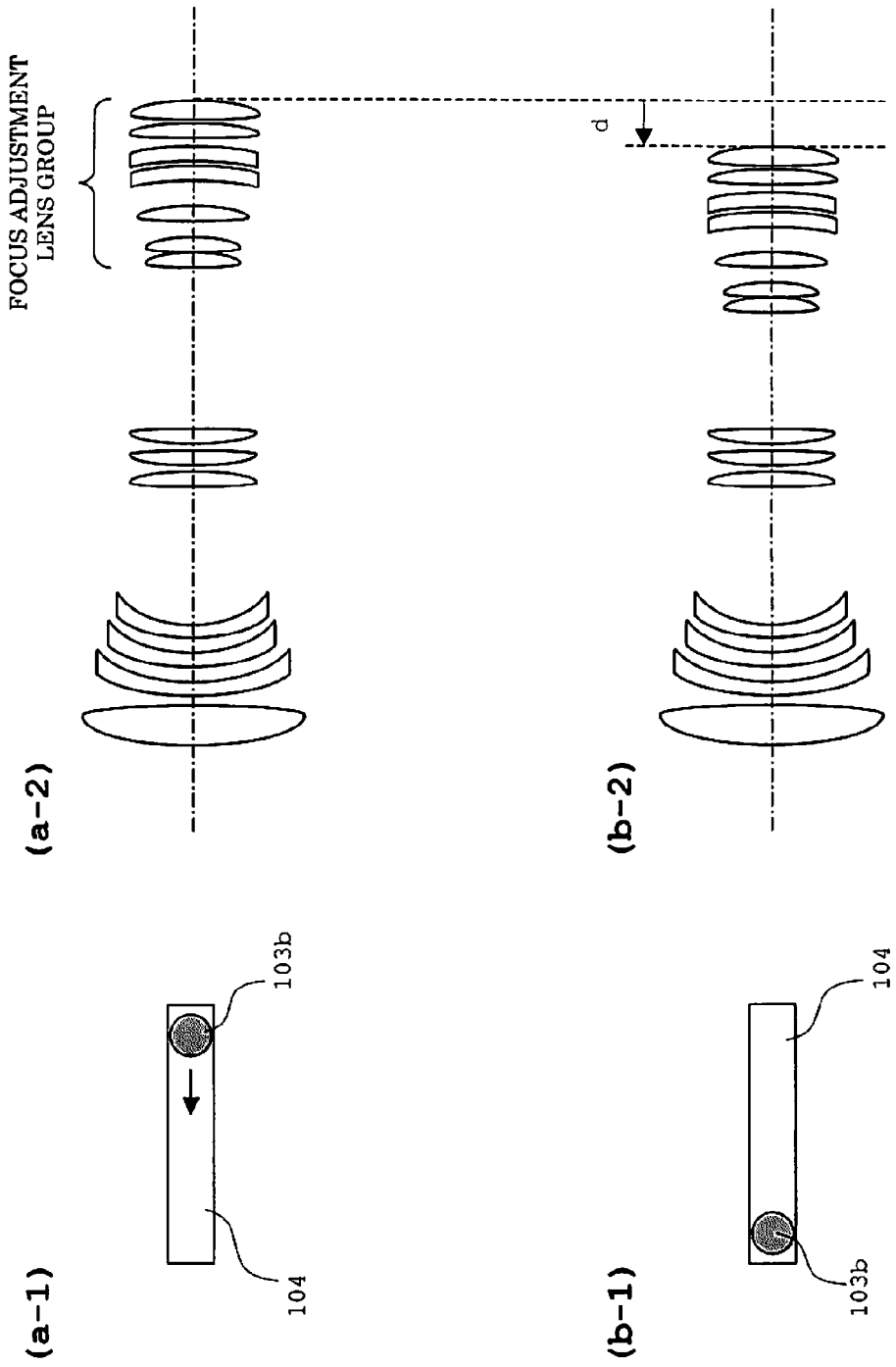
FIG. 5 is an illustrative view of a focus adjustment operation in the projector according to the embodiment of the present invention.

FIG. 5 illustrates shift of a group of focus adjustment lenses when the projector main body 100 is vertically moved. FIGS. 5 (a-1) and (a-2) respectively illustrate a position of the pin 103b and a shifted position of the focus adjustment lens group when the projector main body 100 is in the lowermost position. FIGS. 5 (*b*-1) and (*b*-2) respectively illustrate a position of the pin 103*b* and a shifted position of the focus adjustment lens group when the projector main body 100 is in the uppermost position. Note that the group of focus adjustment lenses constitute part of the projection lens 103, and are displaced in a direction of an optical axis in accordance with turning of the focus adjustment ring 103*a*, thereby changing a focus state of projection light.

As shown in FIG. 5, as the projector main body 100 is displaced from the lowermost position to the uppermost position thereof, the pin 103*b* moves from one end to other end of the notch 104, and the group of focus adjustment lenses shift in a direction indicated by an arrow d in FIG. 5 (*b*-2). This brings the projection image on the desktop surface into a focus state suited to a projection size from time to time.

As described above, according to the present embodiment, a change of a projection size and focus adjustment of a projection image can be carried out at the same time merely by turning the knobs 303. In addition, since the focus adjustment ring 103*a* and the projector main body 100 can be driven in cooperation with each other merely by forming the pin 103*b* and the cam 206*b*, a mechanism of cooperation between zoom adjustment and focus adjustment can be extremely simplified. Further, according to the present embodiment, there is no need for a sensor for detecting an amount of displacing the projector main body 100 or no need for a motor for rotating the focus adjustment ring 103*a* in accordance with detection results, which brings about a simplified configuration and reduced costs.

Although the foregoing embodiment is based on a premise that the knobs 303 are turned by hand, the knobs 303 may be turned by a power of a motor or the like.

In addition, the projector main body 100 may be vertically displaced in stages. In this case, the screw hole 205 will be changed into a hole without a thread groove, and the stopper 304 will be changed into a pin without a thread groove. Further, the stopper 304 is biased by biasing means such as a spring toward the rear surface of the projector main body 100, and the tip of the stopper 304 is pressed against the rear surface of the lower housing 102. A series of recesses are vertically formed in the rear surface of the lower housing 102 at positions opposed to the tip of the stopper 304. The recesses are rounded at edges, such that, when the projector main body 100 is vertically displaced, the stopper 304 is also displaced against an urging force, allowing disengagement of the recesses from the tip of the stopper 304.

With such a configuration, when the knobs 303 are turned to move vertically the projector main body 100, the tip of the stopper 304 is repeatedly engaged with the recesses in the rear surface of the lower housing 102, and thus, the projector main body is temporarily locked at a position where the tip of the stopper 304 is engaged with one of the recesses. This allows the projector main body 100 to be vertically displaced in stages.

Further, although the projector main body 100 is displaced by turning the knobs 303 in the foregoing embodiment, the projector main body 100 may be displaced by vertically sliding a slider with respect to the holder 200.

Figure 6A:
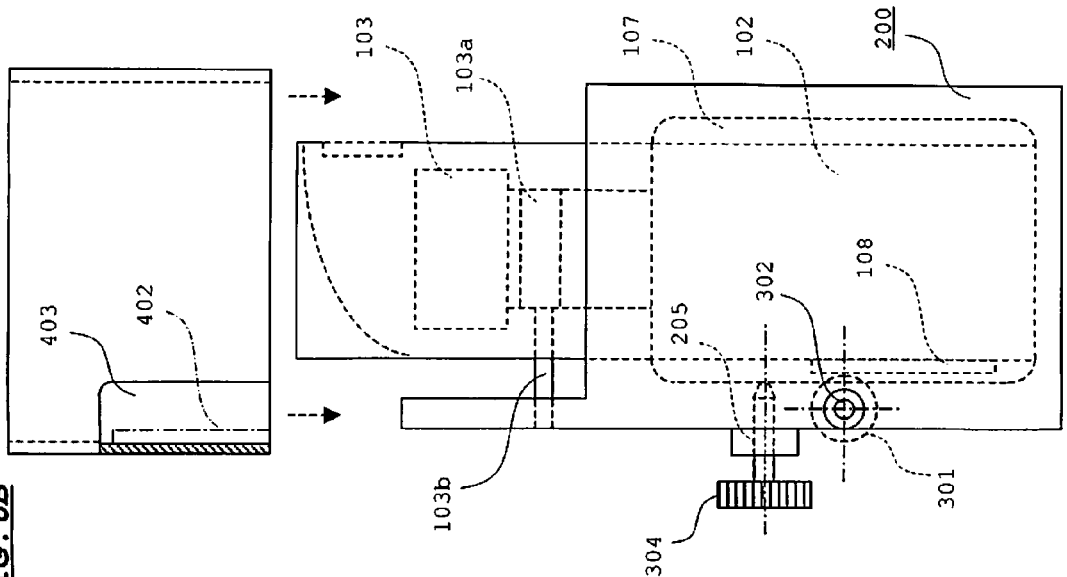
FIGS. 6A and 6B are respectively a rear view and a side view showing a configuration of a projector according to another embodiment of the present invention.
Figure 6B:
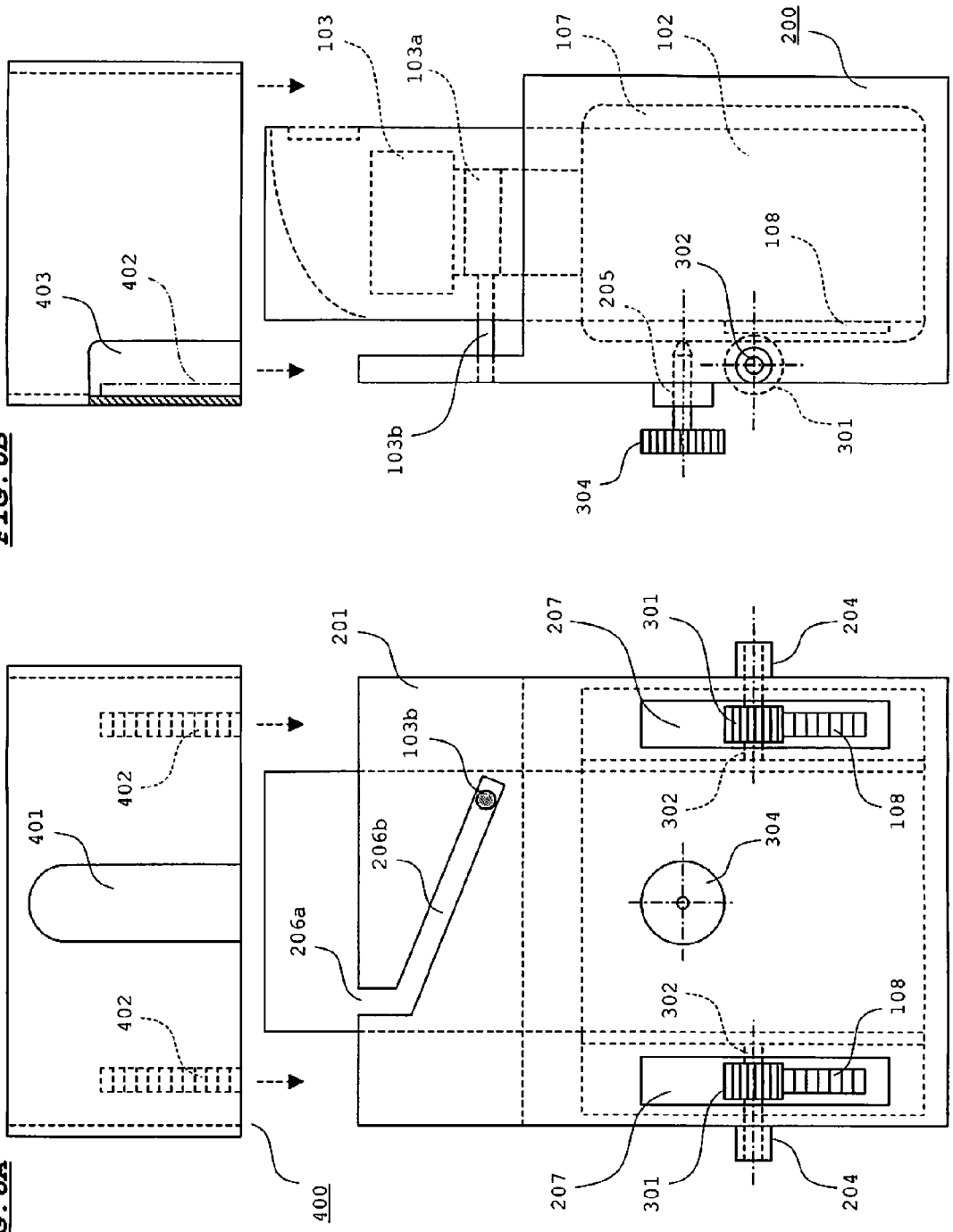

FIGS. 6A and 6B illustrate an example of a configuration in this case. FIG. 6A is a rear view of a projector, and FIG. 6B is a left side view of the projector.

In this example, notches 207 are formed on the rear surface of a holder 200, and pinion gears 301 are exposed through these notches 207 to the outside. Note that each of the pinion gears 301 has a diameter such that the pinion gear 301 slightly protrudes from the rear surface of the holder 200. In addition, bosses 204 have a smaller outer dimension than the bosses in the foregoing embodiment. Further, an end of a pin 103*b* is configured not to protrude from a cam 206*b* to the outside.

A slider 400 has a shape of a rectangular tube with open upper and bottom surfaces and has a notch 401 formed in a rear surface thereof. The notch 401 is provided to prevent a lower end of a rear surface of the slider 400 from colliding against a boss (a portion where a screw hole 205 is formed) in the rear surface of the holder 200. In addition, rack gears 402 are formed in a rear inner surface of the slider 400 to mesh with the pinion gears 301. Further, notches 403 are formed in right and left side surfaces of the slider 400 to prevent collision with the bosses 204 in the holder 200. The slider 400 has an inner contour that is slightly larger than an outer contour of the holder 200.

The slider 400 is attached to the holder 200 such that an outer peripheral surface of the holder 200 is fitted with an inner peripheral surface of the slider 400. A protrusion (not shown) is formed in the inner peripheral surface of the slider 400 for contact with the outer peripheral surface of the holder 200 so that the slider 400 is vertically displaced along the holder 200. When the slider 400 is fitted with the holder 200 in this manner, the rack gears 402 formed in the rear inner surface of the slider 400 are meshed with the pinion gears 301.

Figure 7B:
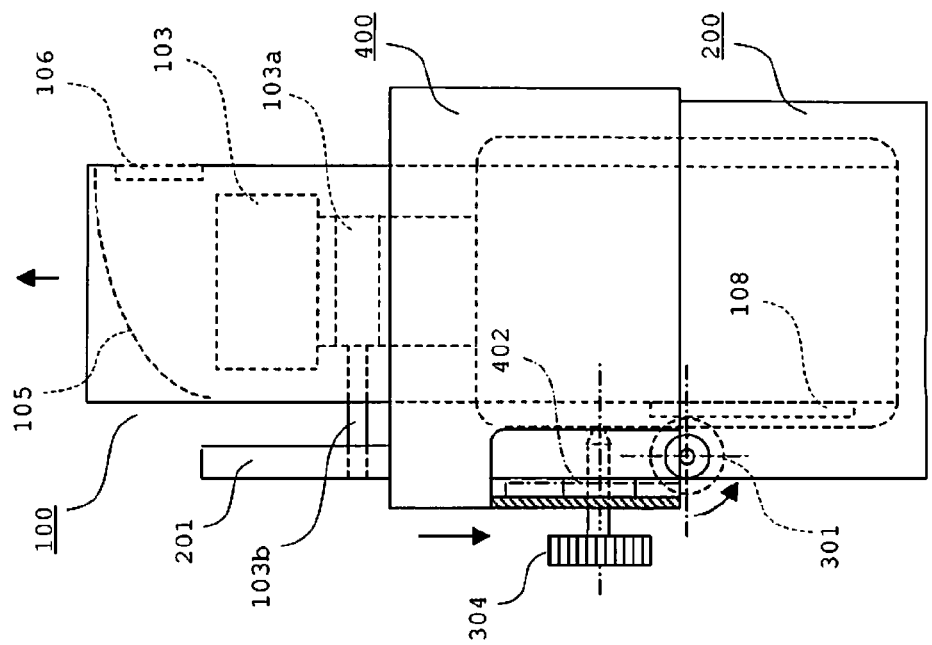
FIGS. 7A and 7B are respectively a rear view and a side view showing a state when a slider according to the another embodiment of the present invention is not yet pressed down.
Figure 7A:
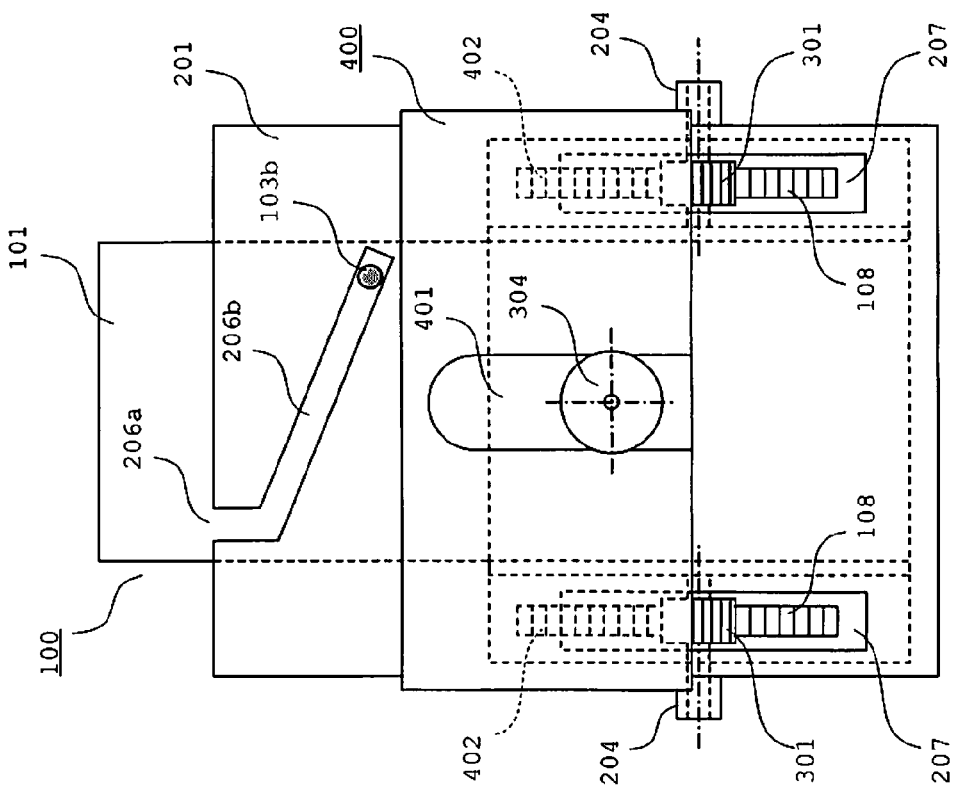

FIGS. 7A and 7B illustrate a state when the rack gears 402 are meshed with the pinion gears 301. FIG. 7A is a rear view of the projector, and FIG. 7B is a left side view of the projector.

When the slider 400 is further pressed down in this state, the rack gears 402 meshed with the pinion gears 301 causes the pinion gears 301 to rotate in a direction shown by an arrow in FIG. 7B. Accordingly, a driving force provided to press down the slider 400 is transmitted via the pinion gears 301 to the rack gears 108, and thus, the projector main body 100 moves vertically along guides 203.

Figure 8B:
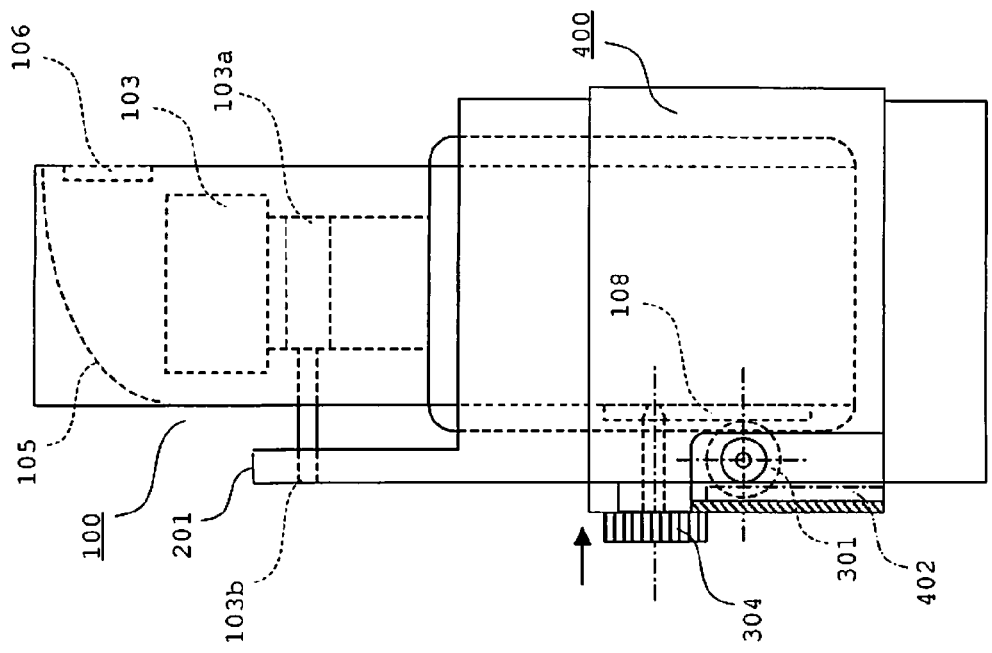
FIGS. 8A and 8B are respectively a rear view and a side view showing a state when the slider according to the another embodiment of the present invention is pressed down.
Figure 8A:
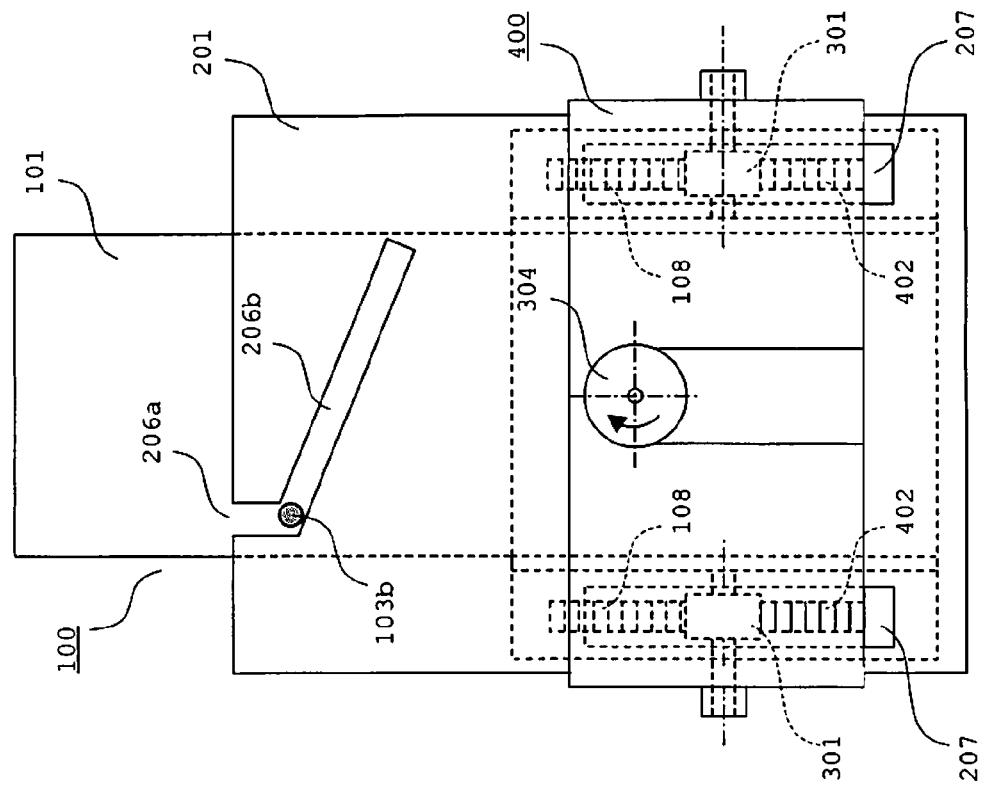

FIGS. 8A and 8B illustrate a state when the slider 400 is pressed down to a lowermost position thereof. FIG. 8A is a rear view of the projector, and FIG. 8B is a left side view of the projector. When the stopper 304 is operated in this state, the projector main body 100 is locked at a position shown in FIGS. 8A and 8B. In this situation, the pin 103*b* is located at an uppermost position in the cam part 206*b*. This allows the projector to be in a focus state such that a projection image is properly focused onto a desktop surface when the projector main body 100 is in the uppermost position thereof.

In the same manner as in the foregoing embodiment, the projector main body 100 may be locked before the projector main body 100 is displaced to a position shown in FIGS. 8A and 8B. In this case, the stopper 304 may be operated when the projector main body 100 is in a desired position. In this state, the pin 103*b* is also located by action of the cam part 206*b* at a position where the projection image is properly focused onto the desktop surface.

In the foregoing embodiment, the movement of the projector main body 100 and the rotation of the focus adjustment ring 103*a* are mechanically cooperated with each other by the pin 103*b* and the cam part 206*b*. Alternatively, separate means for detecting an amount of displacing the projector main body 100 may be provided to rotate and control the focus adjustment lens 103*a* in accordance with detection results.

Figure 9:
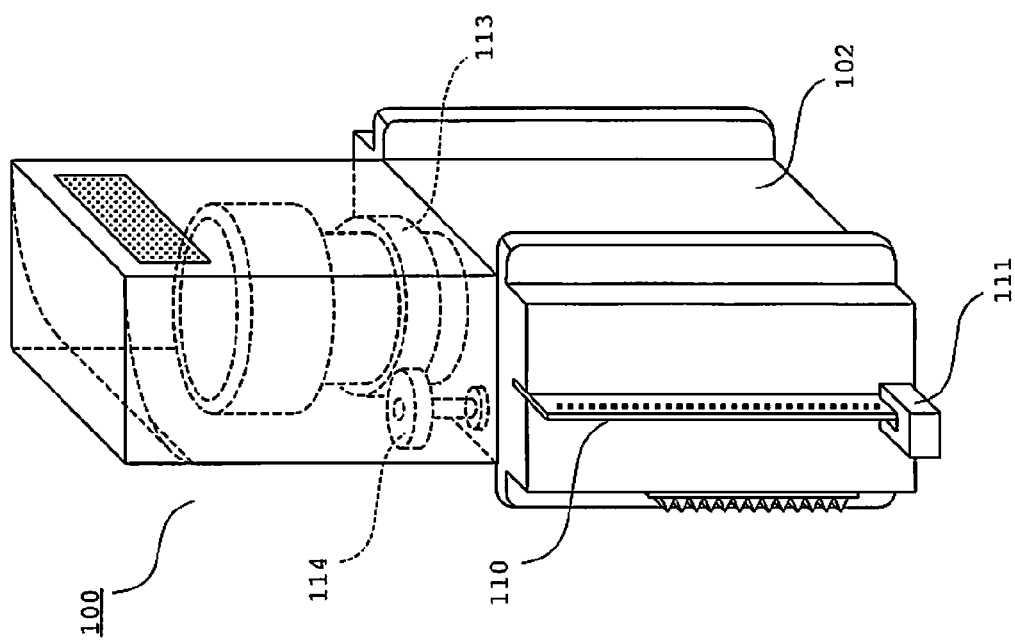
FIG. 9 is a perspective view showing a configuration of a projector according to further another embodiment of the present invention.

FIG. 9 illustrates an example of the configuration mentioned above. In this example, a slit plate 110 with a series of through holes is disposed on a left surface of a projector main body 100, and a photo coupler 111 is disposed on a holder 200 to sandwich the slit plate 110. In addition, a gear is formed on an outer peripheral surface of a focus adjustment ring 113, and a pinion gear 114 is disposed in the upper housing 101 and is meshed with the gear in the outer peripheral surface of the focus adjustment ring 113. The pinion gear 114 is axially supported by a drive shaft of a motor (not shown) disposed in a lower housing 102. Other configurations of the projector main body and holder 200 are the same as those of the foregoing embodiment.

When the projector main body 100 moves vertically, a signal from the photo coupler 111 changes into a pulse form. A position of the project main body 100 is detected by counting the number of pulses from an initial position. In accordance with the detection result, the pinion gear 114 is driven to rotate the focus adjustment ring 113 into a proper position. More specifically, the focus adjustment ring 103a is rotated and controlled via the pinion gear 114, such that, when the projector main body 100 is driven by the driving amount, a projection image is properly focused onto a desktop surface (a projection plane). These control operations are carried out by a circuit part disposed in the lower housing 102.

Figure 10:
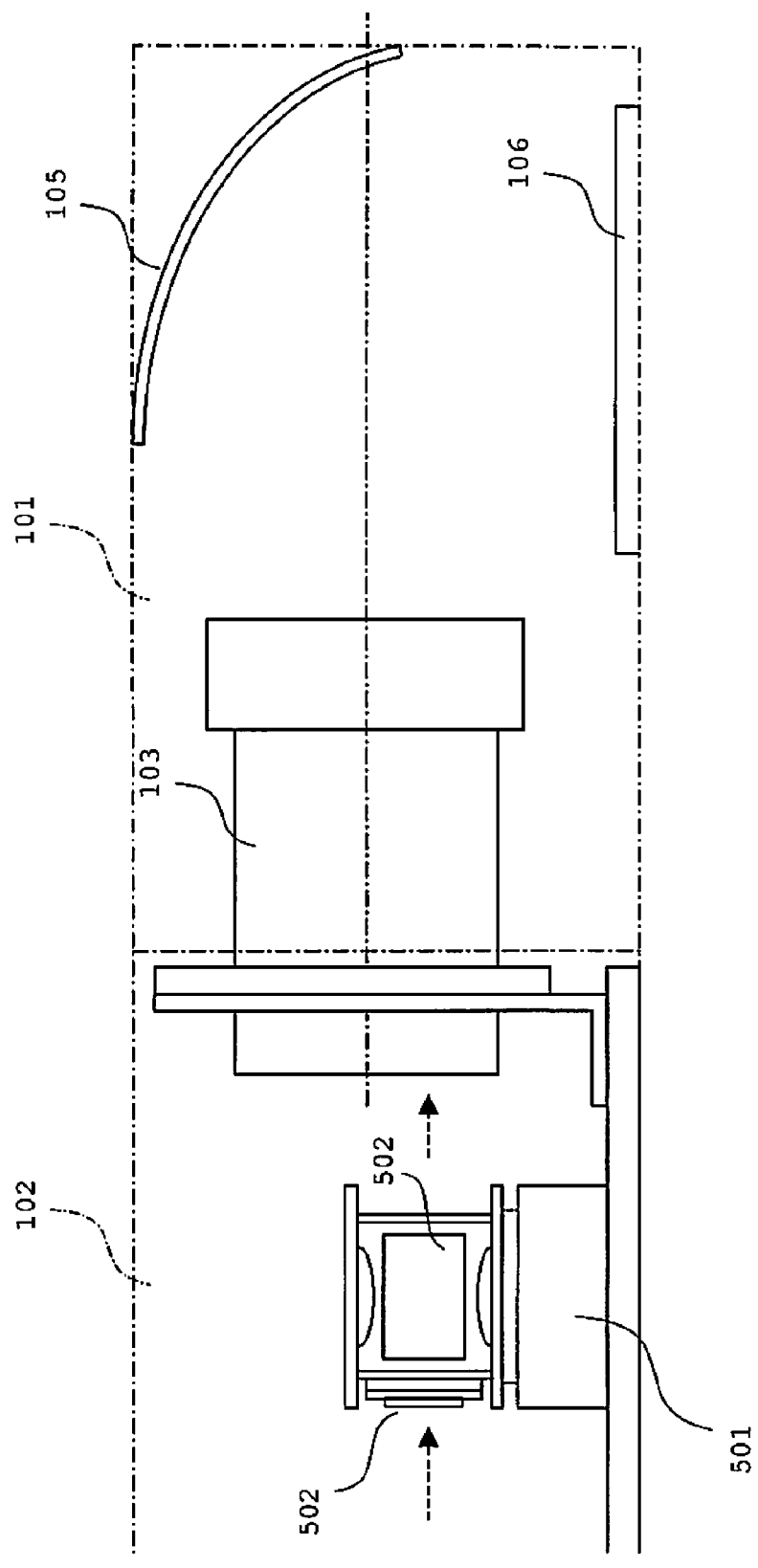
FIG. 10 is a view showing a configuration of a projector according to the further another embodiment of the present invention.

In the foregoing embodiment, as seen from FIGS. 4A and 4B, for example, an edge of a projection image at the projector side shifts to be close to or apart from the projector, in accordance with a change in a projection size. FIG. 10 illustrates an example of a configuration for avoiding this.

In this example, a Z-axis stage 501 is disposed in a lower housing 102. Mounted on the Z-axis stage 501 are display devices 502 for R (red), G (green) and B (blue) colors and an optical assembly comprising a dichroic prism (not shown) for combining light beams that have passed through the display devices 502 and guiding the light beams to a projection lens 103. By driving the Z-axis stage 501, the optical assembly is displaced in a direction orthogonal to an optical axis of the projection lens 103. This allows the display devices 502 to be displaced in the direction orthogonal to the optical axis of the projection lens 103.

FIGS. 11A and 11B illustrate an operation in this example. FIG. 11A shows a state of a projection image when the display devices is not displaced, and FIG. 11B shows a state of a projection image in the foregoing example of the configuration.

Without displacement of the display devices as shown in FIG. 11A, when the projector main body 100 is vertically displaced, an image projected onto a desktop surface is shifted. In contrast to this, the display devices 502 are placed in a wide-end position (shown by a solid line) in FIG. 11B when the projector main body 100 is moved to the uppermost position, and the display devices 502 are placed in a telephoto-end position (shown by a dotted line) in FIG. 11B when the projector main body 100 is moved to the lowermost position, thus eliminating a shift in the image on the desktop surface as shown in FIG. 11B. Note that a difference in displacement of the display devices between the telephoto-end position and the wide-end position is set as appropriate, in accordance with an amount of displacing the projector main body 100 and a change in a distance between an emitting position of projection light and a desktop surface (projected position).

In the example shown in FIGS. 10 and 11, positions of the display devices 502 are adjusted in accordance with a displacement position of the projector main body 100 to suppress a shift in the projection image, as stated above. For example, when the projector is configured as shown in FIG. 9, the Z-axis stage 501 is driven in accordance with detection of a position of the projector main body 100, and thus, the display devices 502 are placed in a position suited to a set position of the projector main body 100.

According to this embodiment, it is possible to change the projection size and make a focus adjustment to the projection image at the same time and also to suppress a shift in the projection image. This provides the projectors with great benefits to a user.

As above, the embodiments of the present invention have been described. However, the present invention is not limited to these embodiments. Various changes can be made to the foregoing embodiments of the present invention as appropriate, without deviating from a technical concept defined in the scope of the claims.

What is claimed is:

1. A projection display apparatus, comprising:
    a projection distance adjustment mechanism for adjusting a distance between a projection plane onto which a projection image is projected and an emitting position of projection light;
    a focus adjustment mechanism for making a focus adjustment of the projection image with respect to the projection plane; and
    a focus drive adjustment part for driving of the focus adjustment mechanism such that the projection image is properly focused onto the projection plane in accordance with the distance between the projection plane and the emitting position, wherein
    the projection distance adjustment mechanism comprises a fixing part and a driven part supported by the fixing part so as to be capable of being displaced, and a projection optical system including at least a projection lens is disposed in the driven part, wherein
    the projection optical system comprises a mirror that reflects the projection light that has passed through the projection lens in a direction approaching the projection lens, rather than in a direction perpendicular to an optical axis of the projection lens, and guides the projection light to the projection plane,
    the projection optical system is displaced in a direction of the optical axis of the projection lens in accordance with displacement of the driven part, and
    the distance between the emitting position of projection light reflected by the mirror and the projection plane is changed in accordance with displacement of the projection optical system.

2. A projection display apparatus according to claim 1, comprising:
    a display device drive mechanism for optically displacing a display device for image projection in a direction perpendicular to an optical axis of a projection lens; and a display device drive control part for driving and controlling the display device drive mechanism in accordance with a driving amount of the projection distance adjustment mechanism, wherein
    the display device drive control part drives and controls the display device drive mechanism to suppress a shift in the projection image on the projection plane caused by a change in a driving position of the projection distance adjustment mechanism.

3. A projection display apparatus according to claim 1, wherein
    the focus drive adjustment part comprises a transmitting mechanism for mechanically transmitting the driving amount of the projection distance adjustment mechanism to the focus adjustment mechanism, wherein
    the transmitting mechanism converts the driving amount of the projection distance adjustment mechanism into a driving amount of the focus adjustment mechanism so that, when the projection distance adjustment mechanism is driven by the driving amount, the projection image is properly focused onto the projection plane, and the transmitting mechanism transmits the converted driving amount to the focus adjustment mechanism.

4. A projection display apparatus according to claim 3, wherein the focus adjustment mechanism comprises a focus adjustment ring rotating in a circumferential direction, a focus state of the projection image changes in accordance with the rotation of the focus adjustment ring, the transmitting mechanism comprises a protrusion disposed on the focus adjustment ring, and a cam that is formed in the driven part of the projection distance adjustment mechanism, engages with the protrusion, and displaces the protrusion in a circumferential direction of the focus adjustment ring in accordance with driving of the driven part, and the cam has a shape such that a driving amount of the driven part is converted into a driving amount suited to the focus adjustment mechanism.

5. A projection display apparatus according to claim 3, comprising:

a display device drive mechanism for optically displacing a display device for image projection in a direction perpendicular to an optical axis of a projection lens; and a display device drive control part for driving and controlling the display device drive mechanism in accordance with the driving amount of the projection distance adjustment mechanism, wherein the display device drive control part drives and controls the display device drive mechanism so as to suppress a shift in the projection image on the projection plane caused by a change in the driving position of the projection distance adjustment mechanism.

6. A projection display apparatus according to claim 1, wherein the focus drive adjustment part has a driving amount detection part for detecting the driving amount of the projection distance adjustment mechanism, and a drive control part for driving the focus adjustment mechanism in accordance with the driving amount detected by the driving amount detection part.

7. A projection display apparatus according to claim 6, wherein the focus adjustment mechanism comprises a focus adjustment ring rotating in a circumferential direction, a focus state of the projection image changes in accordance with the rotation of the focus adjustment ring, the drive control part comprises a drive mechanism for driving the focus adjustment ring in a circumferential direction and a motor for providing a power to the drive mechanism, and drives and controls the motor in accordance with the driving amount detected by the drive amount detection part.

8. A projection display apparatus according to claim 6, comprising:

a display device drive mechanism for optically displacing a display device for image projection in a direction perpendicular to an optical axis of a projection lens; and a display device drive control part for driving and controlling the display device drive mechanism in accordance with the driving amount of the projection distance adjustment mechanism, wherein the display device drive control part drives and controls the display device drive mechanism so as to suppress a shift in the projection image on the projection plane caused by a change in the driving position of the projection distance adjustment mechanism.

* * * * *